United States Patent
Nakagawa et al.

[11] Patent Number: 6,152,821
[45] Date of Patent: *Nov. 28, 2000

[54] VIDEO GAME MACHINE, METHOD FOR GUIDING DESIGNATION OF CHARACTER POSITION, AND COMPUTER-READABLE RECORDING MEDIUM ON WHICH GAME PROGRAM IMPLEMENTING THE SAME METHOD IS RECORDED

[75] Inventors: Eiji Nakagawa, Kakogawa; Yasuo Okuda, Moriguchi, both of Japan

[73] Assignee: Konami Co., Ltd., Hyogo-ken, Japan

[*] Notice: This patent is subject to a terminal disclaimer.

[21] Appl. No.: 09/323,768

[22] Filed: Jun. 1, 1999

[30] Foreign Application Priority Data

Jun. 3, 1998 [JP] Japan .................................. 10-154958

[51] Int. Cl.[7] .................................................. A63F 13/00
[52] U.S. Cl. ........................................ 463/4; 463/1; 463/2
[58] Field of Search .................................. 463/1, 2, 3, 4, 463/7, 23

[56] References Cited

U.S. PATENT DOCUMENTS

| | | | |
|---|---|---|---|
| 4,372,556 | 2/1983 | Minkoff et al. | 273/85 G |
| 5,263,723 | 11/1993 | Pearson | 273/439 |
| 5,636,920 | 6/1997 | Shur et al. | 364/410 |
| 5,885,156 | 3/1999 | Toyohara et al. | |

FOREIGN PATENT DOCUMENTS

| | | | |
|---|---|---|---|
| 0686944A2 | 12/1995 | European Pat. Off. | G06T 11/00 |
| 0844580 | 5/1998 | Germany . | |

OTHER PUBLICATIONS

O Trulsen, A Rundberg: "Championship Manager Season 97/98" Online!, Nov. 1997 (Nov. 1997), pp. 1–10, XP002116024 Retrieved from the Internet: <URL:http://www.gamesdomain.comgdreview/zones/reviews/pc/nov97/cm9798.htm1> 'retrieved on Sep. 17, 1999!*p. 4, paragraph 5* *p. 6, paragraph 5*.

T. Chown: "Premier Manager 3", "Online!, Apr. 1995 (Apr. 1995), pp. 1–5, XP002116025, Retrieved from the Internet: <URL:http"//www.gamesdomain.com/gdreview/zones/reviews/pc/pm3.htm1> retrieved on Sep. 21, 1999! *p. 2, paragraph 5 0 p. 3, paragraph 3* *p. 4, paragraph 2*.

*Primary Examiner*—Valencia Martin-Wallace
*Assistant Examiner*—Julie Kasick
*Attorney, Agent, or Firm*—Jordan and Hamburg LLP

[57] ABSTRACT

A video game machine runs a game on a monitor display screen by enabling a user to control the motion of at least one character assigned to one of a plurality of positions that require the character to play a role peculiar to the position. The game machine has the following component units: an instruction operating unit for enabling the character to be assigned to a selected position from among the plurality of positions; a parameter storage unit for storing parameter values peculiar to the character, for a plurality of parameter items that are related to the nature of the game; a weight storage unit for storing weight values given to the parameter items for each of the plurality of positions, the weight values indicating the degree of significance of each parameter item in view of the role required by each of the plurality of positions; a suitability value calculating unit operative in response to the assignment of the character to the selected position by the instruction operating unit, for calculating a suitability value indicative of a degree of suitability of the character to the selected position, in terms of a weight average determined through multiplying the parameter values by the weight values of the corresponding parameter items; and an informing unit for informing the user of the calculated suitability value.

12 Claims, 10 Drawing Sheets

GOAL DECISIVENESS
SHOOTING
CURVING
SPEED
DASHING
STAMINA
JUMPING
KEEPING
DEFENSE
PASSING
RIGHT-FOOTED OR LEFT-FOOTED
KEEPER STABILITY
KEEPER PUNCHING / CATCHING
DASHING-HOLDING ABILITY
HEIGHT
WEIGHT
ATTACKING SENSE
DEFENDING SENSE
SIDEWAYS ALERTNESS
POST-PLAY
ENTERTAINING CHARACTERISTICS
CAPTAINCY
CONDITION STABILITY

FIG. 4

| PLAYER | PARAMETER |
|---|---|
| YAMAZAKI | 72, 57, 54, 75, 85, 80, 78, 60, 56, 43, 71, 14, 11, 57, 78, 74, 55, 23, 71, 43, 63, 80, 43 |
| SHIMIZU | 70, 63, 69, 79, 74, 65, 68, 65, 70, 75, ------------ |
| -------- | |

FIG. 5

{ 1, 10, 1, 5, 8, 5, 30, 3, 3, 1, 0, 30, 5, 1, 3, 3, 0, 0, 0, 0, 0, 0, 0, 0, 0, 0 }, GOALKEEPER

{ 5, 3, 1, 10, 5, 5, 20, 5, 50, 5, 0, 0, 0, 1, 3, 3, 0, 1, 0, 0, 0, 0, 0, 0, 0, 0 }, SWEEPER
{ 5, 3, 1, 10, 5, 5, 30, 5, 45, 5, 0, 0, 0, 1, 3, 3, 0, 1, 0, 0, 0, 0, 0, 0, 0, 0 }, CENTER BACK
{ 5, 3, 1, 10, 5, 5, 30, 5, 40, 5, 0, 0, 0, 1, 3, 3, 0, 1, 0, 0, 0, 0, 0, 0, 0, 0 }, STOPPER
{ 7, 5, 2, 20,10, 5, 3, 5, 20, 5, 0, 0, 0, 1, 1, 1, 1, 0, 0, 0, 0, 0, 0, 0, 0, 0 }, SIDE BACK

{10, 5, 2, 20, 10, 5, 3, 10, 15, 5, 0, 0, 0, 1, 1, 1, 1, 0, 0, 0, 0, 0, 0, 0, 0, 0 }, WING BACK
{15, 5, 3, 10, 10, 5, 5, 15, 30, 15, 0, 0, 0, 1, 2, 3, 1, 1, 0, 0, 0, 0, 0, 0, 0, 0 }, DEFENSIVE HALF
{25, 10, 3, 10, 15, 5, 5, 25, 5, 25, 0, 0, 0, 1, 2, 3, 1, 1, 0, 0, 0, 0, 0, 0, 0, 0 }, OFFENSIVE HALF

{20, 10, 2, 20, 10, 5, 3, 15, 5, 5, 0, 0, 0, 1, 1, 1, 1, 1, 0, 0, 0, 0, 0, 0, 0, 0 }, WINGER
{40, 10, 2, 10,10, 5, 30, 20, 5, 5, 0, 0, 0, 1, 3, 3, 1, 0, 0, 1, 0, 0, 0, 0, 0, 0 }, CENTER FORWARD
{35, 10, 2, 15, 20, 5,10, 20, 5, 5, 0, 0, 0, 1, 2, 3, 1, 0, 0, 0, 0, 0, 0, 0, 0, 0 }, STRIKER

VIDEO GAME MACHINE, METHOD FOR GUIDING DESIGNATION OF CHARACTER POSITION, AND COMPUTER-READABLE RECORDING MEDIUM ON WHICH GAME PROGRAM IMPLEMENTING THE SAME METHOD IS RECORDED

BACKGROUND OF THE INVENTION

1. Field of the Invention

The present invention relates to video game systems (machines) using, for example, a cassette-type recording medium, such as an optical disc, a magnetic disk, or a semiconductor memory, on which program data concerning, for example, a soccer game is recorded. The invention also relates to a video game method for use in the above type of system and to a computer-readable recording medium on which a game program implementing the above method is recorded.

2. Description of the Related Art

Hitherto, many kinds of video game systems have been proposed. For example, one type of video game system is formed of a home-use game machine and a television monitor. Another type of video game system is a commercial-use game machine consisting of a personal computer or a workstation, a display unit, and a sound output device. Each of the above systems includes a controller operated by a game user, a recording medium on which game program data is recorded, a central processing unit (CPU) that controls the elements of the system to produce sound and images based on the game program data, a processor for creating images, a processor for producing sound, a cathode ray tube (CRT) monitor for displaying images, and a speaker for outputting sound. As the above-described recording medium, a compact disc-read only memory (CD-ROM), a semiconductor memory, and a cassette that integrates a semiconductor memory are primarily used.

As the above type of game, various kinds of games are known, and one of these is a soccer game, in which a plurality of characters are displayed on a CRT screen and compete against each other. In the soccer game, a game user controls game characters (players) on the user side to perform actions, such as dribbling, passing, and shooting a ball, by operating a controller, thereby allowing the players to compete. Accordingly, the soccer game is a video game that has highly entertaining and competitive characteristics.

In the soccer game of the above type, character's capabilities related to the soccer game, such as goal decisiveness, shooting, curving, speed, dashing, etc., have been set as parameters ranging from 0 to 99, thereby providing characteristics for the individual characters. These parameters are indicated on the monitor screen, and also, the averages of the respective parameters are calculated and indicated together. Accordingly, the game user is able to utilize the parameters and their averages as a guide to assigning the individual players to the respective positions.

In the soccer game, however, the roles of the players are varied according to the positions. The characteristics (capabilities) provided for the players may be suitable or unsuitable for the intended positions. Conventionally, the averages of the parameters are not sufficient to optimally assign the players to suitable positions. By providing a greater number of parameters, the players' characteristics are more precisely expressed. However, only part of the parameters, for example, the major parameters, can be displayed on the monitor screen because of limitation in the display area of the monitor screen. Thus, it is even more difficult to allocate the players to suitable positions.

SUMMARY OF THE INVENTION

Accordingly, in view of the above background, it is an object of the present invention is to provide a game machine in which suitability values useful as guides for assigning characters to suitable positions are calculated and informed, as well as a method for guiding designation of character positions and also a computer-readable recording medium on which a game program implementing the above method is recorded.

To these ends, according to one aspect of the present invention, there is provided a video game machine which runs a game on a monitor display screen by enabling a user to control the motion of at least one character assigned to one of a plurality of positions that require the character to play roles peculiar to the positions, comprising: instruction operating means for enabling the character to be assigned to a selected position from among the plurality of positions; parameter storage means for storing parameter values peculiar to the character, for a plurality of parameter items that are related to the nature of the game; weight storage means for storing weight values given to the parameter items for each of the plurality of positions, the weight values indicating the degree of significance of each parameter item in view of the role required by each of the plurality of positions; suitability value calculating means operative in response to the assignment of the character to the selected position by the instruction operating means, for calculating a suitability value indicative of the degree of suitability of the character to the selected position, in terms of the weight average determined through multiplying the parameter values with the weight values of the corresponding parameter items; and informing means for informing the user of the calculated suitability value.

According to another aspect of the present invention, there is provided a method for guiding designation of a character in a video game which proceeds on a monitor display screen by enabling a user to control the motion of at least one character assigned to one of a plurality of positions that require the character to play roles peculiar to the positions, comprising the steps of: storing parameter values peculiar to the character, for a plurality of parameter items that are related to the nature of the game; storing weight values given to the parameter items for each of the plurality of positions, the weight values indicating the degree of significance of each parameter item in view of the role required by each of the plurality of positions; calculating, in response to the assignment of the character to the selected position by instruction operating means, a suitability value indicative of the degree of suitability of the character to the selected position, in terms of the weight average determined through multiplying the parameter values with the weight values of the corresponding parameter items; and informing the user of the calculated suitability value.

According to still another aspect of the present invention, there is provided a computer-readable recording medium storing a game program for giving a guide to designation of a character in a video game which proceeds on a monitor display screen by enabling a user to control the motion of at least one character assigned to one of a plurality of positions that require the character to play roles peculiar to the positions, the program comprising the steps of: storing parameter values peculiar to the character, for a plurality of parameter items that are related to the nature of the game;

storing weight values given to the parameter items for each of the plurality of positions, the weight values indicating the degree of significance of each parameter item in view of the role required by each of the plurality of positions; calculating, in response to the assignment of the character to the selected position by instruction operating means, a suitability value indicative of the degree of suitability of the character to the selected position, in terms of the weight average determined through multiplying the parameter values with the weight values of the corresponding parameter items; and informing the user of the calculated suitability value.

The game may employ only one character for a plurality of positions or, alternatively, may proceed with a plurality of characters assigned to a plurality of positions. Parameter values have been stored for each character on each of parameter items that are related to the nature of the game, while degrees of significance of the parameter items peculiar to the respective positions have been stored in terms of weight values. When the user operates the instruction operating means to assign a character to one of the plurality of positions, a suitability value indicative of the degree of suitability of the character to this position is calculated in terms of a weight average through multiplication of the parameter values peculiar to the character with the weight values peculiar to the position. The suitability value thus calculated is informed to the user through a display on the monitor display screen or through a vocal message. When the user assigns the same character to a different position, the suitability value is calculated with this position and informed to the user. The user therefore can easily determine the position suitable for the character based on the comparison of the suitability values calculated on different positions.

Thus, the informing means may be arranged to inform the user of the suitability value by displaying the suitability value on the monitor display screen. This enables the user to recognize the suitability value simply by observing the monitor display screen.

The monitor display screen may display parameter items selected from among the plurality of parameter items, together with the associated parameter values. With this arrangement, the user can roughly grasp the characteristics of each character. In addition, the parameter values of parameter items that are omitted from the display are also taken into account in the calculation of the suitability value, so that no substantial inconvenience is caused in evaluating the suitability. In addition, unexpectedly high or low suitability value may result from the incorporation of the parameter values that are not shown on the display, thus enhancing the fun of the game.

The video game may further comprise zone storage means for grouping the plurality of positions into a plurality of zones based on the similarity of the roles required by the plurality of positions, and for storing the plurality of positions on the zone basis, and zone register means for registering the character in relation to at least one specific zone. In such a case, the suitability value calculating means, when the position to which the character has been assigned by the instruction operating means falls out of the specific zone, multiplies the weight average with a factor which is less than 1, thereby determining the suitability value. The suitability value thus determined indicates that the character is not so good at the position to which the character is assigned.

The arrangement also may be such that the weight value is set to zero when the degree of significance of the parameter item is least significant. This maximizes the effectiveness of the parameter values on the determination of the suitability, while minimizing calculation load.

When a plurality of characters are employed, the instruction operating means assigns different characters to all of the plurality of positions. In this case, the parameter storage means store parameter values peculiar to each of the characters, and the suitability value calculating means calculates the suitability value for each of the characters. It is therefore possible to assign all the characters to the positions where the characters can fully exert their capabilities.

The game may be a soccer game that employs a team on the user's side and a competitor team. The user can set up the strongest formation for its team.

The game may employ characters of a number exceeding the number of the positions are employed including spare characters. In such a case, the video game machine further comprises: zone storage means for grouping the plurality of positions into a plurality of zones based on the similarity of the roles required by the plurality of positions, and for storing the plurality of positions on the zone basis; zone register means for registering the character in relation to at least one specific zone; and check instruction means associated with the suitability value calculating means; wherein the instruction operating means operates to fill all the positions with characters selected from all the characters including the spare characters. The suitability value calculating means operates in response to an instruction given by the check instruction means in regard to each spare character, so as to calculate the suitability values of the spare character on all the positions within the zone in which the spare character has been registered, and determines the mean of the suitability values as the suitability value. With this arrangement, the suitability values are available also on the spare members, thus providing effective information which is to be considered when a member or members are to be changed.

These and other objects, features and advantages of the present invention will become clear from the following description of the preferred embodiment when the same is read in conjunction with the accompanying drawings.

DESCRIPTION OF THE PREFERRED EMBODIMENTS

Figure 1:
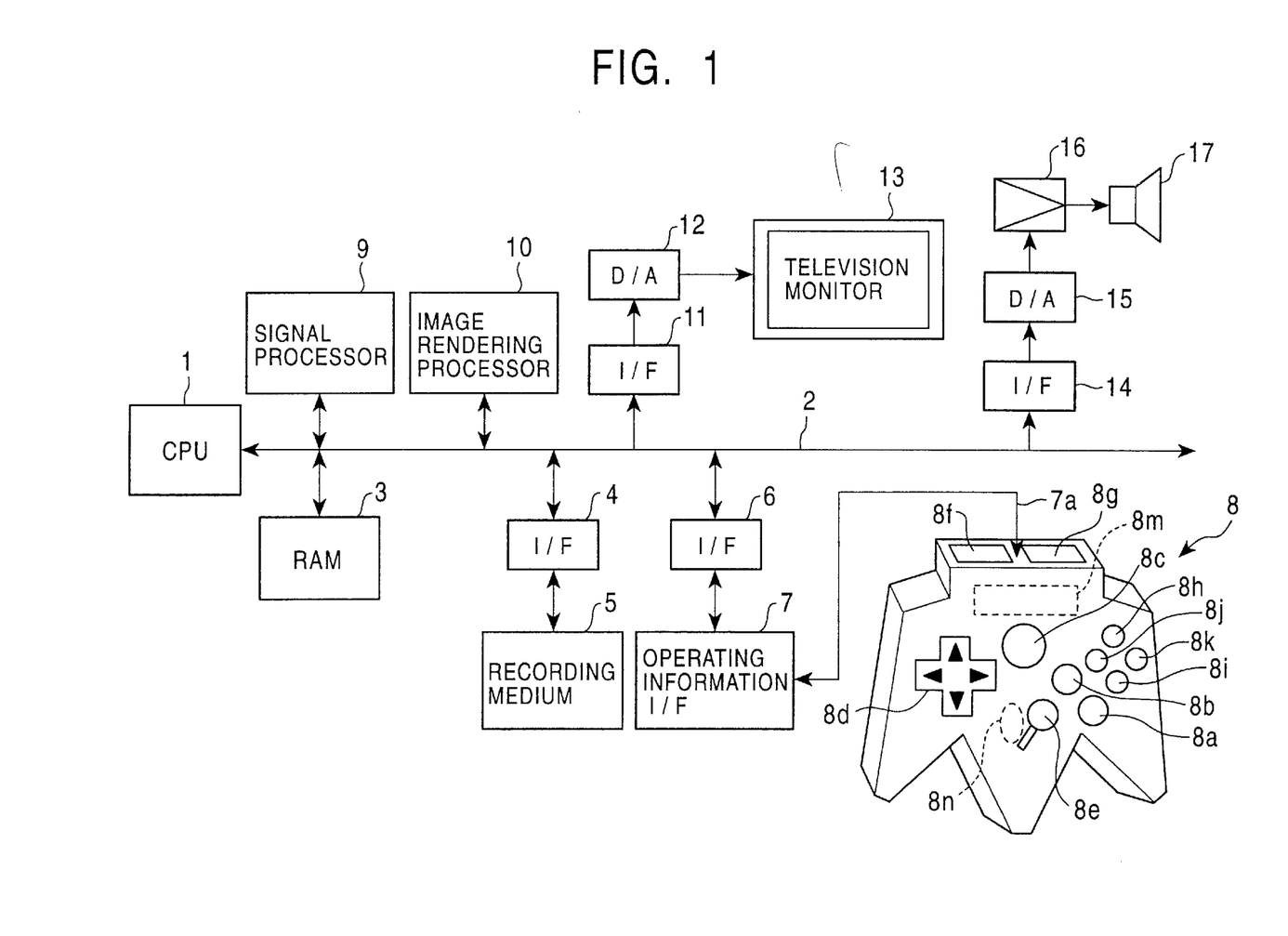
FIG. 1 is a block diagram showing a configuration of a game machine embodying the present invention.

Referring to the block diagram illustrating an embodiment of the present invention shown in FIG. 1, a game system is formed of a game machine unit, a television monitor 13 for outputting game images, a pre-main amplifier 16 and a speaker 17 for outputting game sound, and a recording medium 5 on which game data including images, sound and program data is recorded. The recording medium 5 may be an optical disc, a floppy disk, or a ROM cassette in which a ROM storing, for example, the above game data and operating system program data is accommodated within a plastic casing. A medium directly mounted on a game circuit board may also be included.

More specifically, the game machine unit is configured in the following manner. A bus 2 integrating an address bus, a data bus, and a control bus, is connected to a CPU 1. Connected to the bus 2 are a random access memory (RAM) 3, an interface circuit 4, an interface circuit 6, a signal processor 9, an image rendering processor 10, an interface circuit (buffer) 11, and an interface circuit 14. A controller 8 is connected to the interface circuit 6 via an operating-information interface circuit 7. Digital-toanalog (D/A) converters 12 and 15 are connected to the interface circuits 11 and 14, respectively.

The configuration of the game system varies according to the intended purpose of use. More specifically, if the game system is for home use, the television monitor 13, the pre-main amplifier 16, and the speaker 17 are provided separately from the game machine unit. On the other hand, if the game system is for commercial use, all the elements shown in FIG. 1 are integrated into a single housing. If the game system is primarily formed by a personal computer or a workstation, the following elements are used in place of the above-described elements of the game system. A display unit for a computer or a workstation is substituted for the television monitor 13. Part of the game program data recorded on the recording medium 5 or hardware on an expansion board mounted on a computer expansion slot is used instead of the image rendering processor 10. Hardware on an expansion board mounted on a computer expansion slot is substituted for the interface circuits 4, 6, 11, and 14, the D/A converters 12 and 15, and the operating-information interface circuit 7. An area of a computer main memory or an expansion memory is used in place of the RAM 3. In this embodiment, it is assumed that the game system is for home use.

The individual elements shown in FIG. 1 are now discussed in greater detail. The signal processor 9 primarily performs calculations for view-point positions (in this embodiment the height and the direction of a camera, a change in zoom power, etc., which will be described later) and character positions in a three-dimensional space in relation to the view-point positions, calculations for transforming three-dimensional space positions into pseudo-three-dimensional space positions, and calculations for illumination, and creates and processes sound data.

The image rendering processor 10 writes (clips) image data into the RAM 3, for example, texture data into a specific area of the RAM 3 defined by polygons, based on the calculations performed by the signal processor 9.

The controller 8 has an A button 8a, a B button 8b, a start button 8c, a cross key 8d, a stick-type controller 8e, a left trigger button 8f, a right trigger button 8g, a C1 button 8h, a C2 button 8i, a C3 button 8j, a C4 button 8k, a connector 8m, and an inward (located on the reverse side of the controller 8) button 8n. A memory device for temporarily storing, for example, the current setting of a game, is attachable to and detachable from the connector 8m. The stick-type controller 8e tilts around a predetermined position of the stick in the area covering 360 levels including the left and right directions and the forward and backward directions and has a function substantially similar to that of a joystick. The C1 button 8h, the C2 button 8i, the C3 button 8j, and the C4 button 8k are referred to as "C buttons" together. The functions of the individual buttons will be discussed when referring to the buttons.

The operation of the aforementioned game system is described below.

A power switch (not shown) is turned on to activate the game machine to cause the CPU 1 to read images, sound, and the game program data from the recording medium 5 based on the operating system stored in the recording medium 5. The read images, sound, and game program data are entirely or partially stored in the RAM 3. Thereafter, the CPU 1 proceeds with the game in accordance with the game program data and other data (image data including polygons and textures of an object to be displayed, and sound data) stored in the RAM 3, and also instructions provided by a game user via the controller 8. Namely, the CPU 1 suitably creates a command, which serves as a task for outputting graphics or sound, based on the instructions provided by the game user via the controller 8. The signal processor 9 performs calculations for view-point positions and character positions in a three-dimensional space (and in a two-dimensional space) in relation to the view-point positions, and calculations for the illumination, and creates and processes sound data, based on the above-described command.

Subsequently, the image rendering processor 10 writes image data into a display area of the RAM 3 based on the calculations performed by the signal processor 9. The image data is then supplied to the D/A converter 12 via the interface circuit 11 and is converted into an analog video signal. The video signal is further supplied to the television monitor 13 and is displayed on the screen as an image. Meanwhile, the sound data output from the signal processor 9 is supplied to the D/A converter 15 via the interface circuit 14 and is converted into an analog sound signal. The sound signal is then output from the speaker 17 as sound via the pre-main amplifier 16.

Rendering commands may be used for rendering three-dimensional images using polygons and for rendering normal two-dimensional images. In this specification, polygons are defined as polygonal two-dimensional images, and in this embodiment, triangles or quadrilaterals are used.

The rendering commands for rendering three-dimensional images by using polygons are formed of the following items of data. Polygon-vertex address data has been read from the recording medium 5 and stored in the RAM 3. Texture address data indicates the storage location in the buffer 11 of texture data to be clipped on polygons. Color palette address data represents the storage location in the RAM 3 of color palette data indicating the color of the texture data. Luminance data represents the luminance of the texture.

Among the above-described items of data, the polygon-vertex address data can be obtained in the following manner. The image rendering processor 10 performs coordinate transform, based on the amounts by which polygons are translated and rotated on the screen, on polygon-vertex coordinate data in a three-dimensional space calculated by the CPU 1, thereby transforming it into polygon-vertex coordinate data in a two-dimensional space. The image rendering processor 10 writes texture data corresponding to the zone of the display area of the RAM 3 represented by the three-or-four-sided polygon vertex address data.

A single object is formed of a plurality of polygons. The CPU 1 stores three-dimensional coordinate data of each polygon in the RAM 3. When players, i.e., game characters, are moved by operating the controller 8 by the user, in other words, when the player's movements are expressed or when the position from which the players are viewed (the viewpoint position) is changed, the following processing is executed.

The CPU 1 sequentially determines three-dimensional coordinate data of the individual polygons after being translated and rotated, based on the three-dimensional polygon-vertex coordinate data stored in the RAM 3 and the amounts by which the polygons have been translated and rotated. Among the three-dimensional polygon coordinate data obtained as described above, horizontal and vertical coordinate data is supplied to the image rendering processor 10 as the address data on the display area of the RAM 3, i.e., polygon-vertex address data. The image rendering processor 10 then writes texture data represented by predetermined texture address data into a triangle or quadrilateral display area of the buffer 11 represented by the three-or-four-sided polygon vertex address data. This makes it possible to display on the screen of the monitor 13 objects (user's players and opposing players, referees, a field, a goal net, stands, spectators, etc.) obtained by clipping the texture data on a plurality of polygons.

The normal two-dimensional rendering commands are formed of vertex address data, texture address data, color palette address data, which represents the storage location in the RAM 3, of color palette data indicating the color of the texture data, and luminance data indicating the luminance of the texture data. Among the above-mentioned items of data, the vertex address data is coordinate data obtained by performing coordinate transform by the image rendering processor 10 on the two-dimensional vertex coordinate data calculated by the CPU 1, based on the amounts by which the polygons have been translated and rotated. The rendering operation is hereinafter simply referred to as "issuing a rendering command".

The-signal processor 9 stores adaptive differential pulse code modulation (ADPCM) data read from the recording medium 5 in the RAM 3, and the ADPCM data is used as a sound source. The signal processor 9 then reads the ADPCM data from the RAM 3 at a clock frequency of, for example, 44.1 KHz. The signal processor 9 then performs processing, such as pitch conversion, noise addition, envelope setting, level setting, reverb addition, etc., on the ADPCM data. If the sound data read from the recording medium 5 is pulse code modulation (PCM) data compliant with, for example, the compact disk-digital audio (CD-DA) format, it is converted into ADPCM data by the signal processor 9. The processing to be executed on the PCM data by using program data is directly performed in the RAM 3. The PCM data is then supplied to the signal processor 9 and is converted into ADPCM data. Subsequently, the above-described various operations are conducted on the ADPCM data, which is then output from the speaker 17 as sound.

The data stored within the recording medium 5 is read by a driver, such as a hard disk drive, an optical disc drive, a floppy disk drive, a silicon disk drive, or a cassette-type medium reader. As the recording medium 5, a hard disk, an optical disc, a floppy disk, or a semiconductor memory may be employed. The driver reads images, sound, and program data from the recording medium 5 and supplies the read data to the interface circuit 4. The interface circuit 4 then executes error correction processing by using error correction code (ECC) on the reproduced data output from the driver, and supplies the error-corrected data to the RAM 3 or to the signal processor 9.

A soccer game employed by the present invention is now described below with reference to FIGS. 2 through 10.

Figure 2:
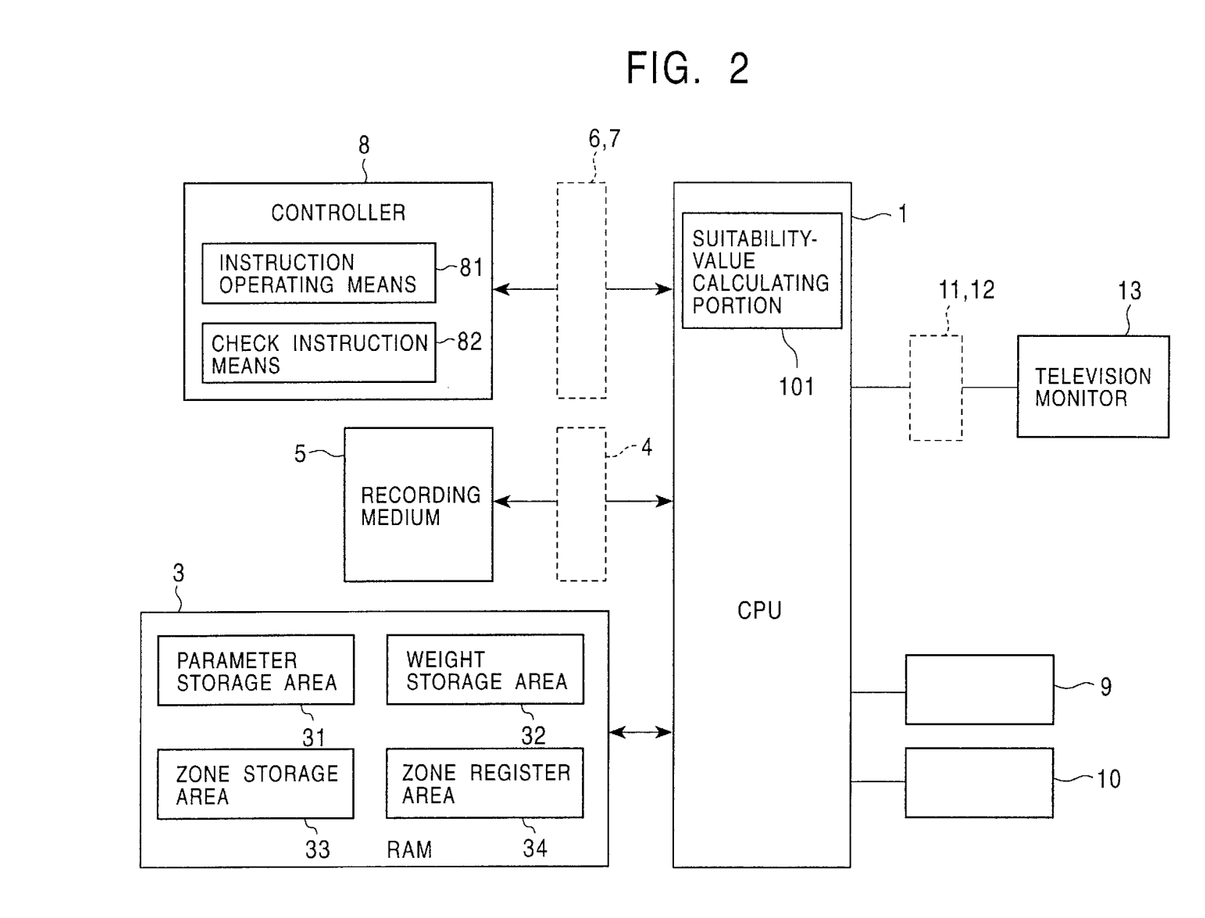
FIG. 2 is a function block diagram showing an arrangement including a CPU and associated components for calculating suitability values in a soccer game machine in accordance with the present invention.

FIG. 2 is a block diagram illustrating the functions of the CPU 1 and the other elements for calculating suitability values.

In FIG. 2, the CPU 1 has a suitability-value calculating portion 101 that calculates suitability values in relation to players' positions by using player data and parameter data written into the RAM 3 from the recording medium 5. The RAM 3 not only stores data for creating characters and a game program based on soccer rules, but also includes a parameter storage area 31, a weight storage area 32, a zone storage area 33, and a zone register area 34.

Figure 3:
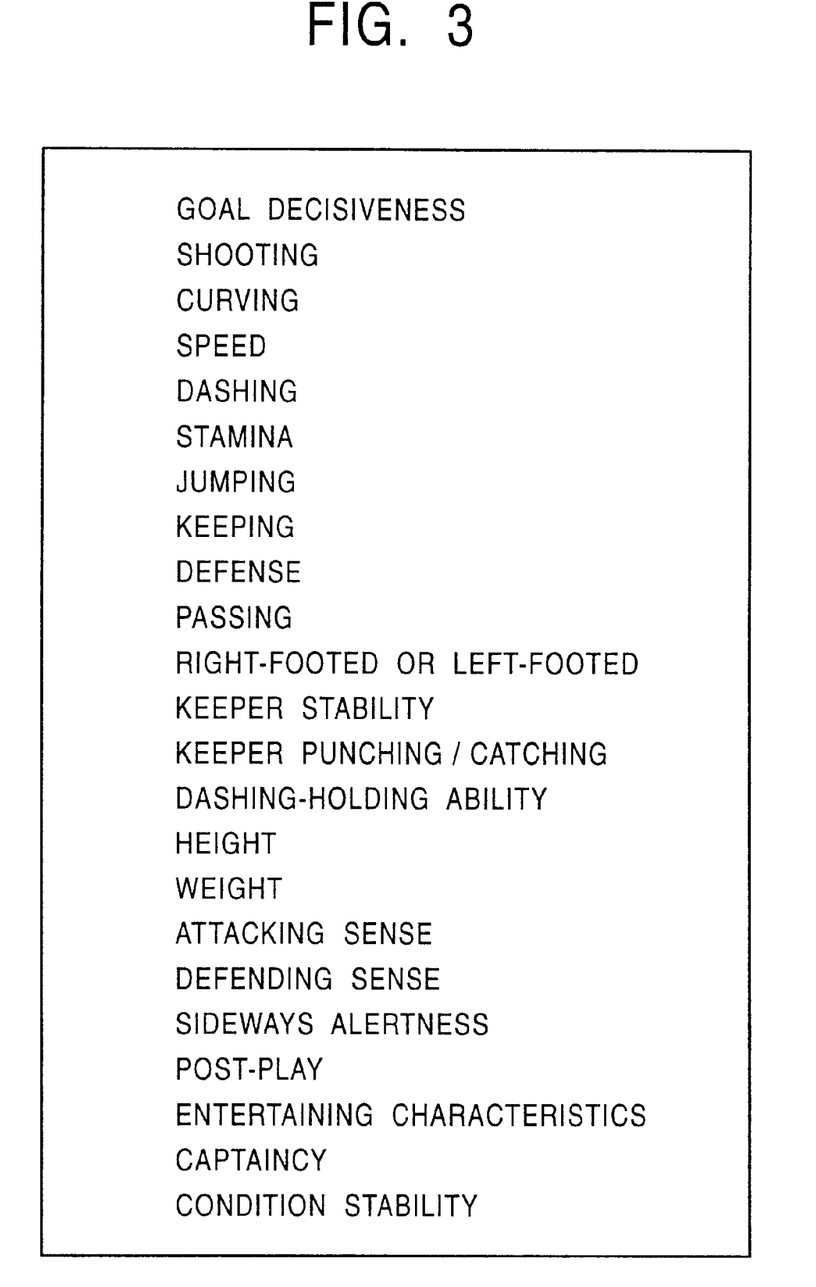
FIG. 3 is a chart illustrative of parameter items.

The parameter storage area 31 stores parameters of the individual players with respect to various players' capability items (parameter items) related to soccer competitions. The parameter items include, as shown in FIG. 3, goal decisiveness, shooting, the ability of curing a shot ball, speed, dashing, stamina, jumping, ball-keeping, defense, and passing. These parameter items are indicated on the right side of the "member selection" screen shown in FIG. 6, in terms of parameter values ranging from 1 to 99, so that the user is able to visually check them. The parameter items also include right-footed or left-footed, keeper stability, keeper punching/catching ability representing keeper defense ability, height, weight, attacking sense, defending sense, sideways alertness, post-play, entertaining characteristics, captaincy indicating the suitability of being the captain, and condition stability, etc. These items are also registered for the individual players as parameters ranging from 0 to 99.

Figure 4:
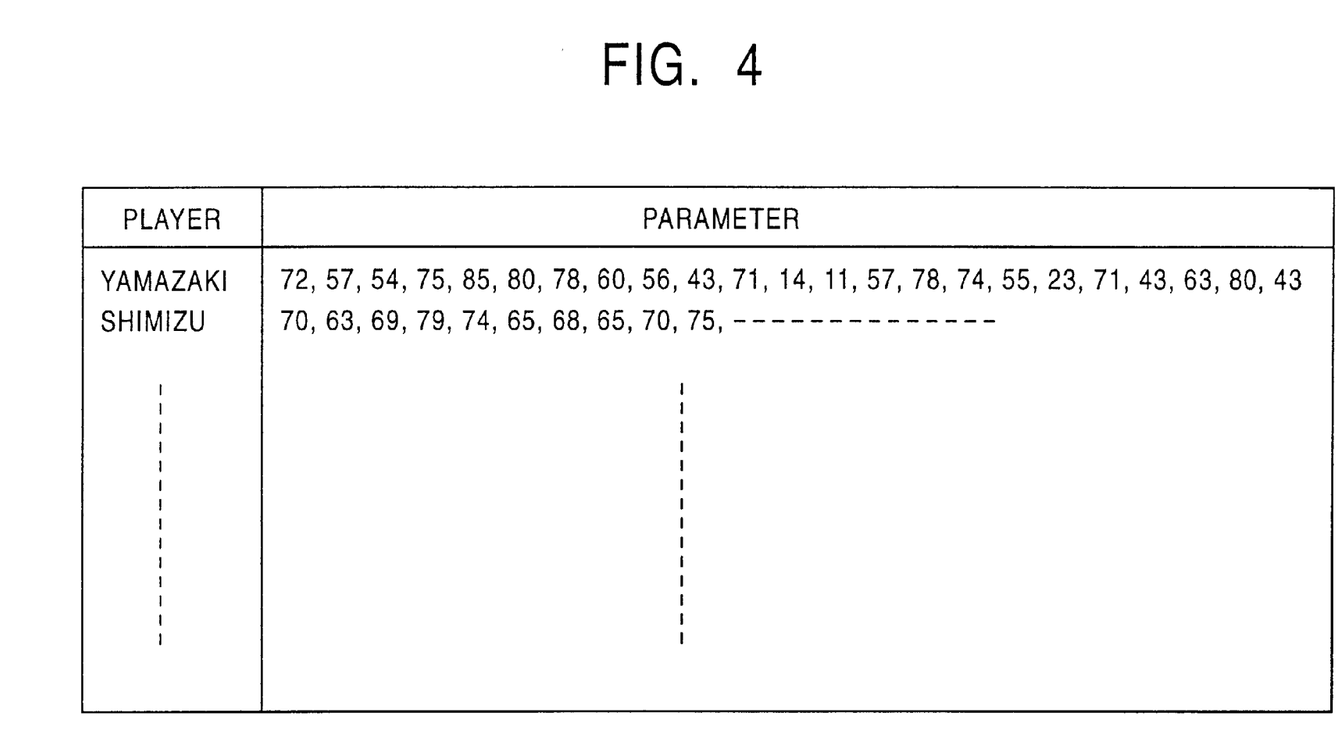
FIG. 4 is an illustration of a parameter table.

FIG. 4 illustrates an example of parameters. Parameters with respect to the parameter items shown in FIG. 3 are provided for at least eleven players, who will participate in a game, such as Mr. Yamazaki", Mr. Shimizu, etc. For example, for Mr. Yamazaki, parameter values, such as "72, 57, 54, 75, . . . 43", are set in the order of the parameter items arranged as shown in FIG. 3. For Mr. Shimizu, parameter values, such as "70, 63, 69, 79, . . . " are set (see the table on the right side of FIG. 6).

Figure 5:
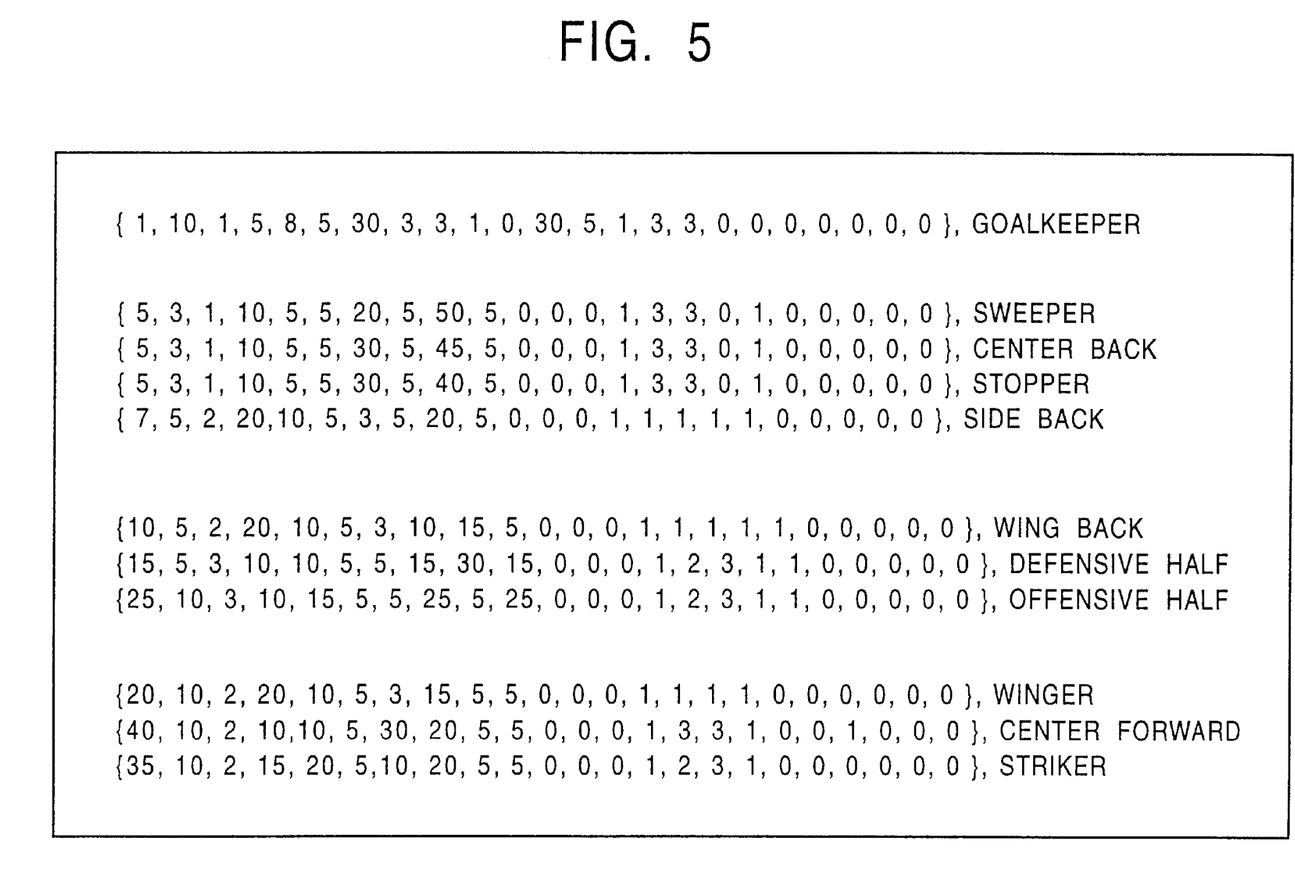
FIG. 5 is an illustration of a table containing data showing, in terms of weight values, the degrees of significance of various parameter items for different positions of soccer game players.

The weight storage area 32 stores, in terms of weight values, the degrees of significance of the parameter items for each of different formation positions. FIG. 5 shows such formation positions by way of example. Formation positions of the soccer game players are grouped into the following zones according to the roles: DF (defenders), MF (midfielders), FW (forwards), and GK (goalkeeper). The DF includes the following positions: SW (sweeper), CB (center back), ST (stopper) and SB (side back). The MF includes WB (wing back), DH (defensive half) and OH (offensive half). The FW includes WG (wing), CF (center forward) and SK (striker). Different roles are assigned to different positions. In the table shown in FIG. 5, weight values ranging from 0 to 50 are allocated to the series of parameter items for each of the formation positions. More specifically, greater weight values are given to the parameter items of higher degrees of significance for each of different formation positions. Thus, the weight value is set to 0 (zero) for a parameter item which is not required at all, in the series of parameter items. For instance, in case of the SK (striker) that is shown at the bottom of the table, the greatest weight value of 35 is given to the parameter item "goal decisiveness". Parameter items "dashing" and "keeping" are ranked second to the highest, so that weight value of 20 is given to each of these parameter items. In the meantime, weight value for the parameter item "keeper stability" is set to 0 (zero), because this kind of ability is not at all required for the striker. In case of GK (goalkeeper), the most important requisite is the "keeper stability", so that weight value is set to 30 for this parameter item. The parameter item "keeper stability", however, is missing from the list of parameter items displayed on the monitor 13, as will be seen from FIG. 6.

The zone storage area 33 stores the zones of formation positions of the game players according to the roles. Thus, the defender zone (DF), midfielder zone (MF), and the forward zone (FW) are stored in this area 33. The zone register area 34 stores the data indicative of the regiment zones of the respective game players.

Figure 8:
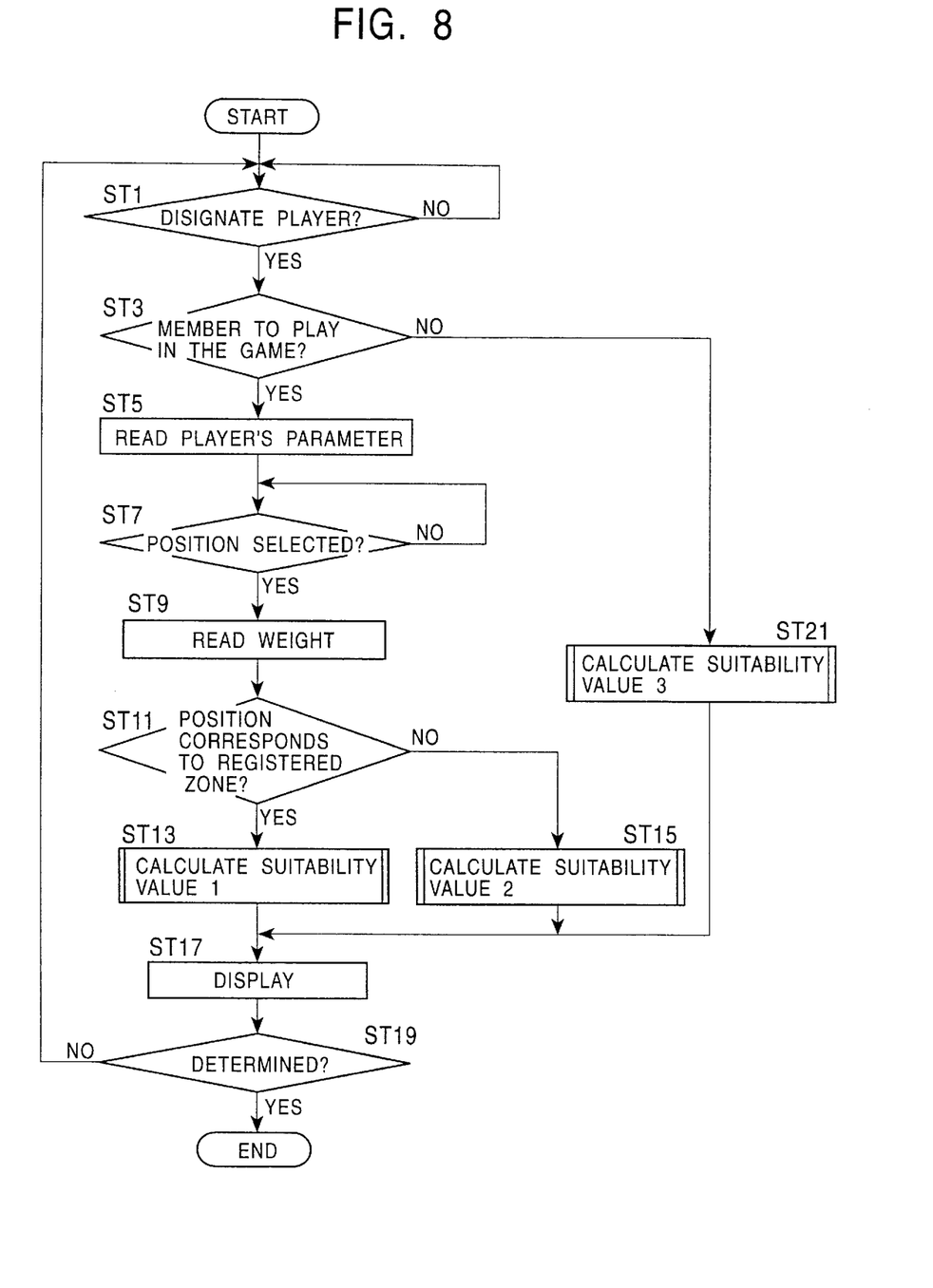
FIG. 8 is a flowchart showing a suitability value calculating program executed by the CPU.

FIG. 8 is a flowchart showing a suitability-value calculating program to be executed by the CPU 1.

The soccer video game implemented by the present invention permits registration of mode or conditions of the game, in advance of the start of the play. To this end, various types of registration display screens are displayed by the registration screen display function possessed by the CPU 1. More specifically, a game mode setting screen is displayed to show icons for selection and registration of a game mode from among various modes such as "league competition", "tournaments" and so on. The user operates a cross key 8d to superpose a cursor on a desired icon to be selected and presses an "A" button 8a, whereby the display is changed to enable the user to proceed with the game in the selected mode. For instance, the "tournaments" mode when selected-brings about a "match setting" display screen to enable the user to set up a series of matches with against different competitor teams. A "formation edit" display screen then appears, showing icons representing various levels of formation setup. An icon "formation change" contains menus indicative of different types of formations to be achieved by the three zones DF, MF and FW. The user designates one of these different types of formations by means of cursor and the "A" button 8a.

Figure 6:
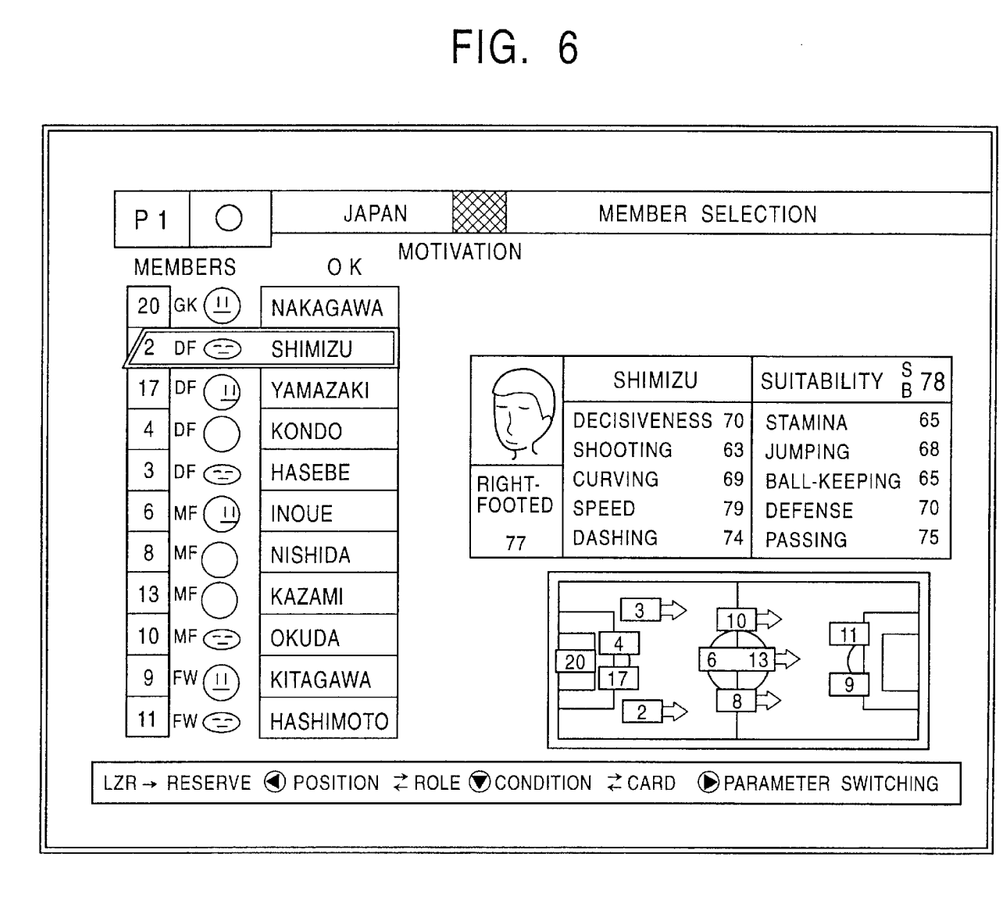
FIG. 6 is an illustration of an image of a "member selection display screen which is displayed to enable a user to assign different player characters to different positions.

Pointing an icon "position change" causes a "member select" display screen to appear, showing a vertical column listing the names and positions of the candidate players, as shown in FIG. 6. The user then operates the cross key 8d which serves as the instruction operating means 81 (see FIG. 2) so as to appoint one of the listed players and presses the "A" button 8a thereby designating the player. This operation corresponds to Step ST1 of the flow shown in FIG. 8. The process then advances to Step ST3 which determines whether the designated player is one of the members to play in the game. If the designated player is a member to participate, parameter values on this player are read from the parameter storage area 31 in Step ST5, and these parameters, together with a portrait of the players are shown at right upper part of the display area. Then, a position to be assigned to the player is selected by means of the cross key 8d and the "A" button 8a, whereby an answer "Yes" is given to the query posed in Step ST7. The process then proceeds to Step ST9 which reads weight data of the selected position from the weight storage area 32. An image of the game field is displayed together with the position of the designated player, at a right lower part of the display area. The position of the game player is adjustable within this display area, by means of the cross key 8d.

The process then advances to Step ST11 which determines whether the selected position allocated to the designated player falls within the zone specified by the zone data that has been registered in the zone register area 34.

If the selected position falls within the specified zone as registered, the process advances to Step ST13 which performs a "suitability value 1 calculation" processing, otherwise Step ST15 is executed to conduct a "suitability value 2 calculation" processing.

If the designated player is a spare player, an answer "No" is given in response to the query posed in Step ST3. This response is regarded as being triggering of the check instruction means 82 (see FIG. 2), so that the process skips to Step ST21 which executes a "suitability value 3 calculation" processing.

Figure 7:
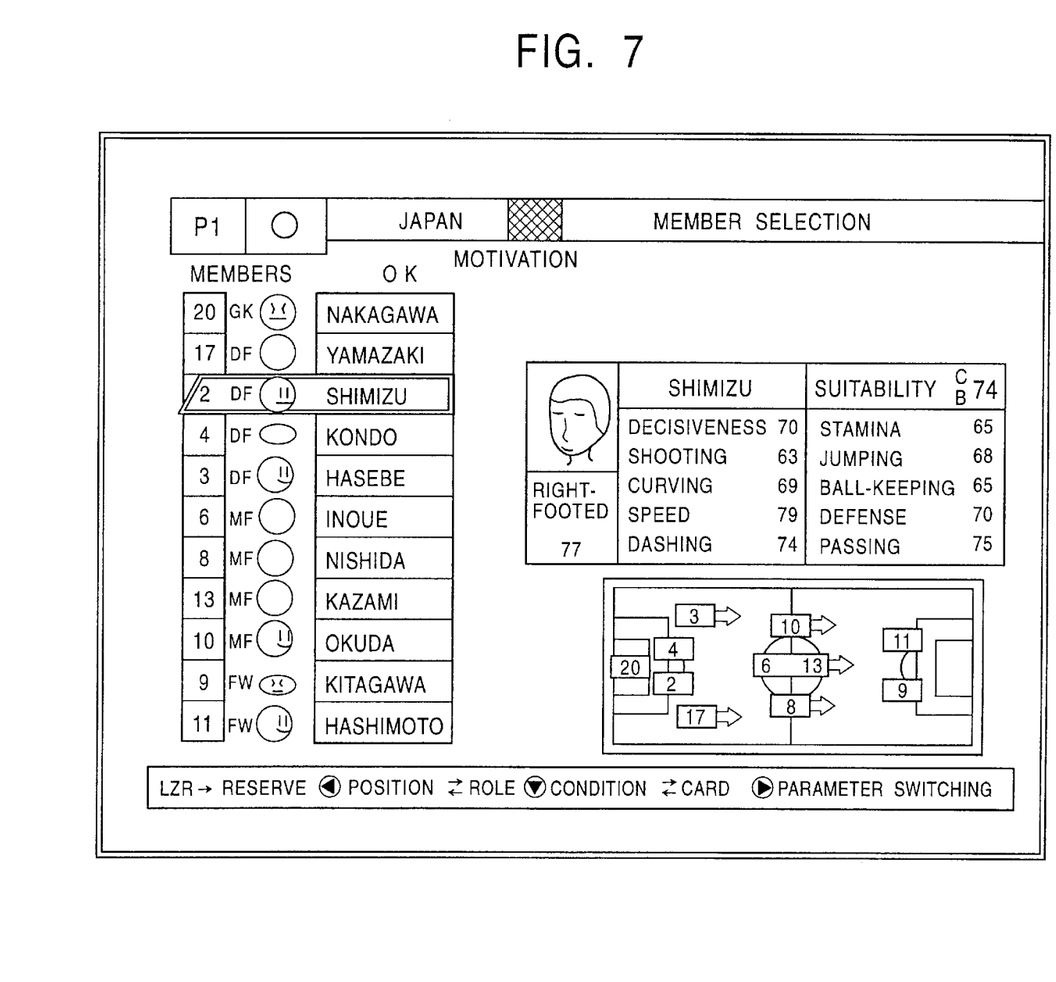
FIG. 7 is an illustration of another image of the "member selection" display screen showing positions after an alteration from positions shown in FIG. 6.

In Step ST17, the suitability value thus computed is displayed on the right side of the player's name which is shown on a right-hand side portion of the monitor screen, as will be seen from FIG. 6 or 7. The suitability value as computed may be vocally announced, instead of being displayed on the monitor screen.

The user, upon determining the player and the position, presses the "A" button 8a. Step ST19 determines whether the player and the player's position have been determined, i.e., whether the "A" button 8a has been pressed. If this button 8a has been pressed, the flow of FIG. 8 is finished (END). The user when unwilling to determine does not press the "A" button 8a, so that the process returns to Step ST1.

A description will now be given of the "suitability value 1 computation" processing, "suitability value 2 computation" processing and the "suitability value 3 computation" processing.

The "suitability value 1 calculation" processing is performed based on the parameter values on the designated player and the weights of the parameter items given to the selected position. This processing is a kind of "weighted average processing", having the steps of multiplying the parameter values given to the designated player by the weight values of the corresponding parameter item based on the selected position, summing the products, summing the weight values of all the parameter items, and dividing the sum of the products by the sum of the weight values. The weight average thus computed is used as the suitability value that is displayed on the right side of the player's name. For instance, FIG. 6 shows that the suitability of the player Mr. Shimizu when appointed as SB (side back) scores 78. Likewise, FIG. 7 shows that the suitability of Mr. Shimizu to the position CB (center back) scores 74. This tells the user that Mr. Shimizu will be better at SB (side back) than at CB (center back), i.e., SB (side back) can more suitably be assigned to Mr. Shimizu than CB (center back).

The "suitability value 2 calculation" processing also relies on the parameter values given to the designated player and the weight values allocated to the selected position for the series of parameter items. Thus, the processing for computing the suitability value 2 is a kind of weight average processing which has the steps of multiplying the parameter values given to the designated player by the weight value 5 given to the corresponding parameter item based on the selected position, summing the products, summing the weight values of all the parameter items, and dividing the sum of the products by the sum of the weight values. The calculation of the suitability value 2, however, employs an additional step of multiplying the quotient, i.e., the weight average, by a coefficient or a factor less than 1.0, e.g., 0.8, and the result is used as the suitability value 2. It is recalled that the answer given in response to the query of Step ST11 was "No", i.e., the position assigned to the designated player does not fall within the zone that has been registered in the zone register area 34 for this player. In this game, characteristics in terms of likelihood or tendency have been assigned to different game player characters by means of, for example, a game programmer, in order to facilitate the setup of formation by the user. Thus, each game player character has its own tendency or adaptability to a specific zone. Selection of a zone different from the registered zone (or selection of a position within such a different zone) is not recommended from the viewpoint of appropriateness of the roles. The above-mentioned factor 0.8 is therefore a reluctant factor that expresses unwillingness to the determination. A smaller suitability value is thus obtained as a result of the multiplication by the factor of 0.8, implying that attaching the designated player to the selected position is rather inappropriate.

The suitability value 3 is calculated when the designated player is a spare member, for the purpose of presenting a suitability value by reference for the user, without specifying any position. More specifically, the spare members have been registered simply in terms of zones in the zone register area 34, but are not correlated to specific positions. Designation of a spare member as a player to participate, therefore, is regarded as being assignment to the member of an arbitrary position, i.e., any or all the positions, within the registered zone in which the member has been nominated. In this case, therefore, suitability values are calculated on the respective positions within the designated zone, and the mean of these suitability values is used as the suitability value to be displayed on the monitor screen. For instance, assuming that the member designated by the check instruction means 82 as a player to participate has been registered as a member expected to play in the FW (forward) zone that includes the three positions of WG (wing), CF (center forward) and SK (striker), a suitable value calculation processing is performed for each of these three positions in the same manner as that for calculating the suitability value 1. Three different suitability values are thus obtained, and the mean of these three values is determined and used as the suitability value for the spare member designated as the player. Alternatively, all these three values of suitability may be displayed simultaneously.

Figure 9:
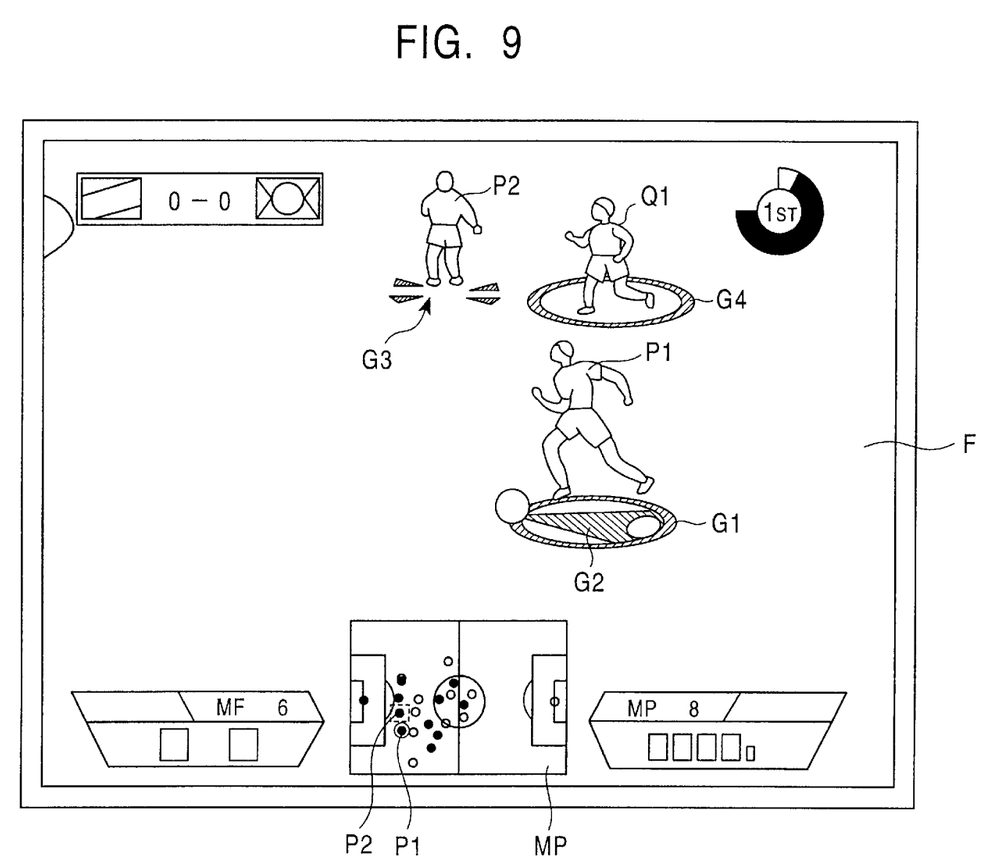
FIG. 9 is an illustration of an image of a scene of a soccer game displayed on a display screen.

FIG. 9 shows an image of a scene of the soccer game which is proceeding. The card of the match is shown at a left upper part of the display area, together with the scores, whereas time left in a half period is shown at a right upper part of the same. Shown at a left lower part of the display area is the name of the player character which is being commanded by the user (indicated by "MF6" in this case), whereas the name of an adjacent competitor player (indicated by "MP8") is shown at a right lower part of the display area.

A user's player P1 keeping the ball, an adjacent competitor player Q1 and an adjacent user's player P2 are displayed in a central portion of a field F which also is on display. The user normally commands the player P1 who keeps the ball. In order to facilitate recognition of the commanded player P1 who keeps the ball, the CPU 1 has a watching function for watching the player P1, a first guide displaying function for displaying a ring-shaped guide mark G1 around the position where the player P1 stands, and a direction guide displaying function for displaying an arrow-shaped guide mark G2 indicating, in a color different from that of the guide mark G1, the direction in which the player P1 moves or the direction of movement of the ball with respect to the player P1, thus facilitating recognition of the direction. The CPU 1 also has a second guide displaying function for displaying, in the same color as the above-mentioned guide mark G1, a guide mark G3 having four guide segments extending radially from the position of the user's player P2 which normally is a player to whom a pass is passable. The second guide displaying function is implemented such that, even when the player P2 has moved beyond a marginal edge of the display area to disappear from the displayed image, part of the guide mark G3 remains displayed on the portion of the marginal edge where the player P2 has disappeared, thereby adequately indicating the direction in which the player P1 should pass the ball. The CPU 1 further has a third guide displaying function for displaying, in a color different from that of the guide mark G1 around the player P1, a ring-shaped guide mark G4 encircling the position where the adjacent competitor player Q1 stands, thereby inviting user's attention.

A description will be given as to the way of giving operational instructions concerning the movement of the player P1. The movement or action of the player P1 is commanded by operational instructions given through the buttons on the controller 8. Means are available for enabling the user to set up his favorite operation pattern. For instance, in an offensive phase of the play, the user can give a dribbling instruction to the player P1 by means of a controller stick 8e so as to cause the player P1 to move while dribbling. Other kinds of motion are available upon operations on the buttons simultaneously with the operation of the controller stick 8e. For instance, a passing action is performed when the "A" button 8a is pressed, while the "B" button 8b when pressed causes the player P1 to shoot. The "C" button includes three buttons: namely, a "C1" button 8h that triggers a "through-pass" action, a "C2" button that causes the player P1 to dash, a "C3" button that corresponds to "lobbing a ball" action, and a "C4" button 8k that when pressed effects a "one-two pass" action. In a defensive phase of the play, motions or actions of the competitor player Q1 are commanded through the buttons in the same way as that for the player P1.

Figure 10:
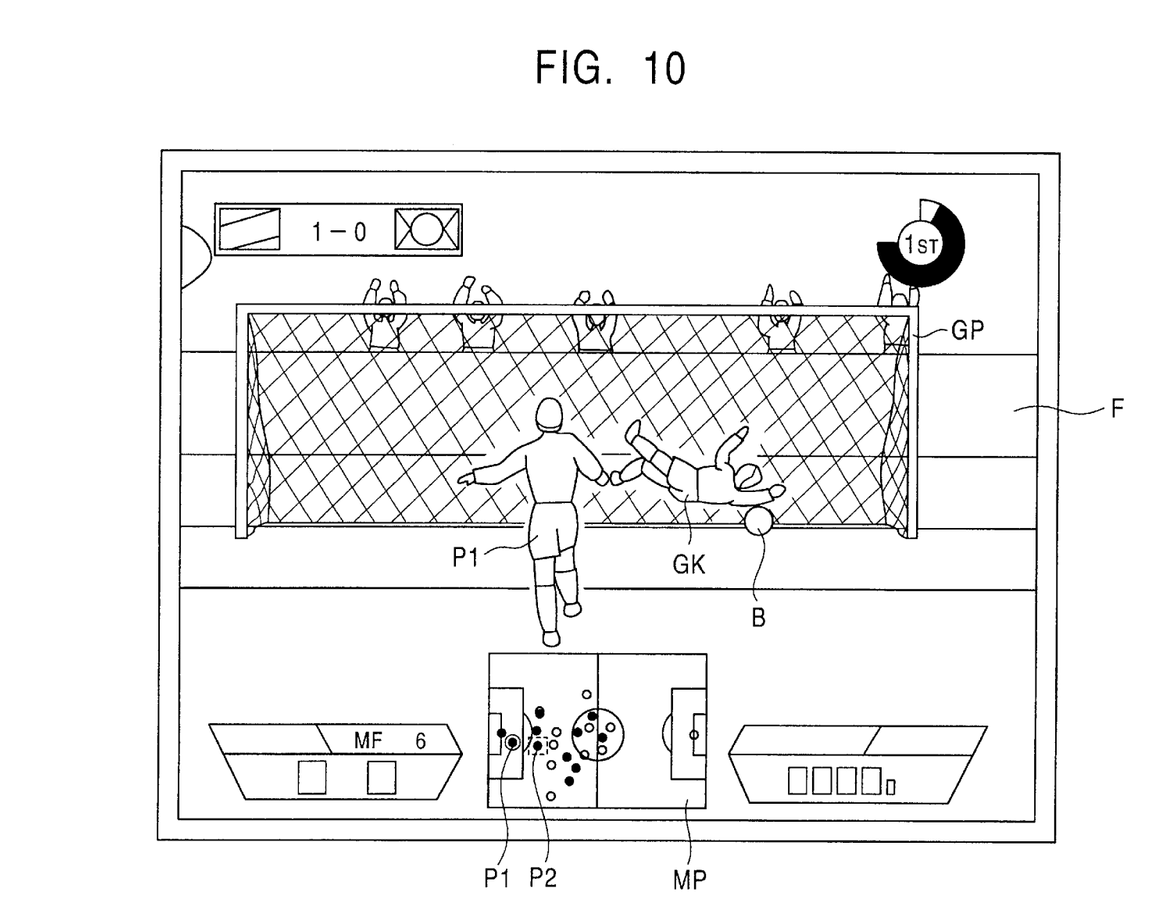
FIG. 10 is an illustration of an image of a scene of shooting a goal.

FIG. 10 shows an image of a scene immediately after a shot that hit the goal. The user has given a shooting instruction by means of the "B" button 8b on the player P1 who had kept the ball. The ball rushed into the goal area passing nearby the goalkeeper GK. It will also be seen that, as shown at the left upper corner of the display image shown in FIG. 10, the scores have been changed to "1-0" from those "0-0" shown in FIG. 9.

A description will now be given of influences of a team motivation coefficient on each of the players.

Parameter values ranging from 1 to 99 have been set on various parameter items for each player. The CPU 1 receives various instructions in regard to motions of the player P1 given through the controller 8, and causes the player P1 to play in accordance with the set parameter values. Practically, the motions or actions of the player are influenced by the parameter values such that a lower parameter value set for a specific parameter item corresponding to a specific motion or action provides a correspondingly low speed of the motion or action, or serves to delay the start of such a motion or action.

For instance, when a moving instruction is generated by the controller 8 requiring the player to move, the delivery of the instruction to the signal processor 9 is delayed by a time which is varied based on the capability value and the motivation index given to the player. Likewise, the speed of the motion or action is variable by changing the speed of rewriting of the running model pattern that was set up previously, or by changing the rate of change of the player's position displayed on the monitor screen. The arrangement may be such that different models of motions or actions are prepared separately in anticipation of lessening of the player's capabilities, and are selectively used in accordance with the present level of the capability. The arrangement also may be such that, for certain item or items of the parameter that pertain to occurrence of events, the probabilities of occurrence of such events are set in the form of functions which include random ranges, and the widths of the random ranges are suitably switched from one to another to increase of decrease the probabilities.

Although an embodiment of the present invention has been described with specific reference to a soccer game, this is only illustrative and the present invention can equally be embodied in other kinds of team-play games which employ different positions requiring different characteristics, i.e., roles, or which rely on specific formations of the players, such as baseball game, hockey game, American football game, and so on. The invention also may be applied to such a type of game that a player or players of a number less than the number of positions are allowed to play at selected positions. For instance, the video game apparatus of the invention may be carried out to implement a game in which each player is allowed to play at a desired position selected from among a plurality of positions (different levels of significance, i.e., weight values, are given to the parameter values for different positions), available for the player. Examples of such a type of game are tennis and ping-pong in which a player under the control of the user is positioned primarily near the net if the characteristics (parameters) allocated to the player are suitable for a quick-attack net play or primarily away from the net if the characteristics (parameters) of the player are more suitable for a rally to wait for self-defeat of the competitor player. The invention also may be carried out in the form of a car driving or racing game which employs a plurality of racing cars of different types. In such a case, the characteristics of each racing car are represented by weight values given to various aspects of the performance of the car, and one of these cars are allocated to each driver in consideration of the driver's capabilities which also are expressed by parameter values.

What is claimed is:

1. A video game machine which runs a game on a monitor display screen by enabling a user to control motion of at least one character assigned to one of a plurality of positions that require the character to play roles associated with the plurality of positions, comprising:

instruction operating means for enabling said character to be assigned to a selected position from among said plurality of positions;

parameter storage means for storing parameter values, associated with said character, for a plurality of parameter items that are related to player characteristics applicable to an overall nature of the game;

weight storage means for storing weight values respectively associated with said parameter items for each of said plurality of positions, said weight values indicating a degree of significance of each of said parameter items to each of said plurality of positions;

suitability value calculating means, operative in response to the assignment of said character to said selected position by said instruction operating means, for calculating a suitability value indicative of a degree of suitability of said character to said selected position, in terms of a weight average determined through multiplying the parameter values by the weight values of the corresponding parameter items; and informing means for informing the user of the calculated suitability value.

2. A video game machine according to claim 1, wherein said informing means informs the user of the suitability value by displaying the suitability value on said monitor display screen.

3. A video game machine according to claim 1, wherein said monitor display screen displays parameter items, selected from among said plurality of parameter items, together with respective ones of the parameter values.

4. A video game machine according to claim 1, wherein one weight value of said weight values is set to zero when the degree of significance of the parameter item to which said one weight is associated is least significant.

5. A video game machine according to claim 1, wherein said instruction operating means assigns different characters to all of said plurality of positions, said parameter storage means store parameter values associated with each of said characters, and said suitability value calculating means calculates the suitability value for each said character.

6. A video game machine according to claim 1, wherein said game employs a team on a side of the user and a side of a competitor team.

7. A video game machine according to claim 1, wherein said game simulates a soccer game.

8. A video game machine which runs a game on a monitor display screen by enabling a user to control motion of at least one character assigned to one of a plurality of positions that require the character to play roles associated with the plurality of positions, comprising:

instruction operating means for enabling said character to be assigned to a selected position from among said plurality of positions;

parameter storage means for storing parameter values, associated with said character, for a plurality of parameter items that are related to player characteristics applicable to an overall nature of the game;

weight storage means for storing weight values respectively associated with said parameter items for each of said plurality of positions, said weight values indicating a degree of significance of each of said parameter items to each of said plurality of positions;

suitability value calculating means, operative in response to the assignment of said character to said selected position by said instruction operating means, for calculating a suitability value indicative of a degree of suitability of said character to said selected position, in terms of a weight average determined through multiplying the parameter values by the weight values of the corresponding parameter items;

informing means for informing the user of the calculated suitability value;

zone storage means for grouping sets of said plurality of positions into ones of a plurality of zones based on similarity of requirements of each set of said plurality of positions, and for storing said plurality of positions on based on respective ones of said plurality of zones;

zone register means for registering said character in relation to at least one specific zone of said plurality of zones;

said suitability value calculating means includes means for multiplying said weight average by a factor which is less than 1 to determine the suitability value when the position to which said character has been assigned by said instruction operating means is not grouped in said specific zone.

9. A video game machine which runs a game on a monitor display screen by enabling a user to control motion of at least one character assigned to one of a plurality of positions that require the character to play roles associated with the plurality of positions, comprising:

instruction operating means for enabling said character to be assigned to a selected position from among said plurality of positions;

parameter storage means for storing parameter values, associated with said character, for a plurality of parameter items that are related to player characteristics applicable to an overall nature of the game;

weight storage means for storing weight values respectively associated with said parameter items for each of said plurality of positions, said weight values indicating a degree of significance of each of said parameter items to each of said plurality of positions;

suitability value calculating means, operative in response to the assignment of said character to said selected position by said instruction operating means, for calculating a suitability value indicative of a degree of suitability of said character to said selected position, in terms of a weight average determined through multiplying the parameter values by the weight values of the corresponding parameter items;

informing means for informing the user of the calculated suitability value;

said plurality of characters being of a number exceeding a number of the plurality of positions and thereby including spare characters;

zone storage means for grouping sets of said plurality of positions into ones of a plurality of zones based on similarity of requirements of each set of said plurality of positions, and for storing said plurality of positions on based on respective ones of said plurality of zones;

zone register means for registering ones of said spare character in relation to at least one specific zone of said plurality of zones;

check instruction means, associated with said suitability value calculating means, indicating whether said character is a spare character;

said instruction operating means operating to fill all said plurality of positions with characters selected from the plurality of characters including said spare characters; and said suitability value calculating means operating in response to said check instruction means to calculate the suitability values of said spare characters for all the positions grouped in the zone in which a given one of said spare characters is registered and determine a mean of the calculated suitability values as said suitability value.

10. A method for guiding designation of a character in a video game which proceeds on a monitor display screen by enabling a user to control motion of at least one character assigned to one of a plurality of positions that require the character to play roles associated with the plurality of positions, comprising the steps of:

storing parameter values, associated with said character, for a plurality of parameter items that are related to player characteristics applicable to an overall nature of the game;

storing weight values respectively associated with said parameter items for each of said plurality of positions, said weight values indicating a degree of significance of each of said parameter items to each of said plurality of positions;

calculating, in response to the assignment of said character to a selected position by user operation of an instruction operating means, a suitability value indicative of a degree of suitability of said character to said selected position, in terms of a weight average determined through multiplying the parameter values by the weight values of the corresponding parameter items; and informing the user of the calculated suitability value.

11. A computer-readable recording medium storing a game program, in executable code, which guides designation of a character in a video game which proceeds on a monitor display screen by enabling a user to control motion of at least one character assigned to one of a plurality of positions that require the character to play roles associated with the plurality of positions, comprising the steps of:

storing parameter values, associated with said character, for a plurality of parameter items that are related to player characteristics applicable to an overall nature of the game;

storing weight values respectively associated with said parameter items for each of said plurality of positions, said weight values indicating a degree of significance of each of said parameter items to each of said plurality of positions;

calculating, in response to the assignment of said character to a selected position by user operation of an instruction operating means, a suitability value indicative of a degree of suitability of said character to said selected position, in terms of a weight average determined through multiplying the parameter values by the weight values of the corresponding parameter items; and informing the user of the calculated suitability value.

12. A video game machine which runs a game on a monitor display screen by enabling a user to control motion of at least one character assigned to one of a plurality of positions that require the character to play roles associated with the plurality of positions, comprising:

instruction operating means for enabling said character to be assigned to a selected position from among said plurality of positions;

parameter storage means for storing parameter values, associated with said character, for a plurality of parameter items that are related to player characteristics applicable to an overall nature of the game, said parameter items including at least one select from a group including goal decisiveness, shooting, curving, speed, dashing, stamina, jumping, keeping, defense, passing, right-footed, keeper stability, keeper punching/catching, dashing-holding ability, height, weight, attacking sense, defending sense, sideways alertness, post-play, entertaining characteristics, captaincy, and condition stability;

weight storage means for storing weight values respectively associated with said parameter items for each of said plurality of positions, said weight values indicating a degree of significance of each of said parameter items to each of said plurality of positions;

suitability value calculating means, operative in response to the assignment of said character to said selected position by said instruction operating means, for calculating a suitability value indicative of a degree of suitability of said character to said selected position, in terms of a weight average determined through multiplying the parameter values by the weight values of the corresponding parameter items; and informing means for informing the user of the calculated suitability value.

* * * * *